Figure 2:
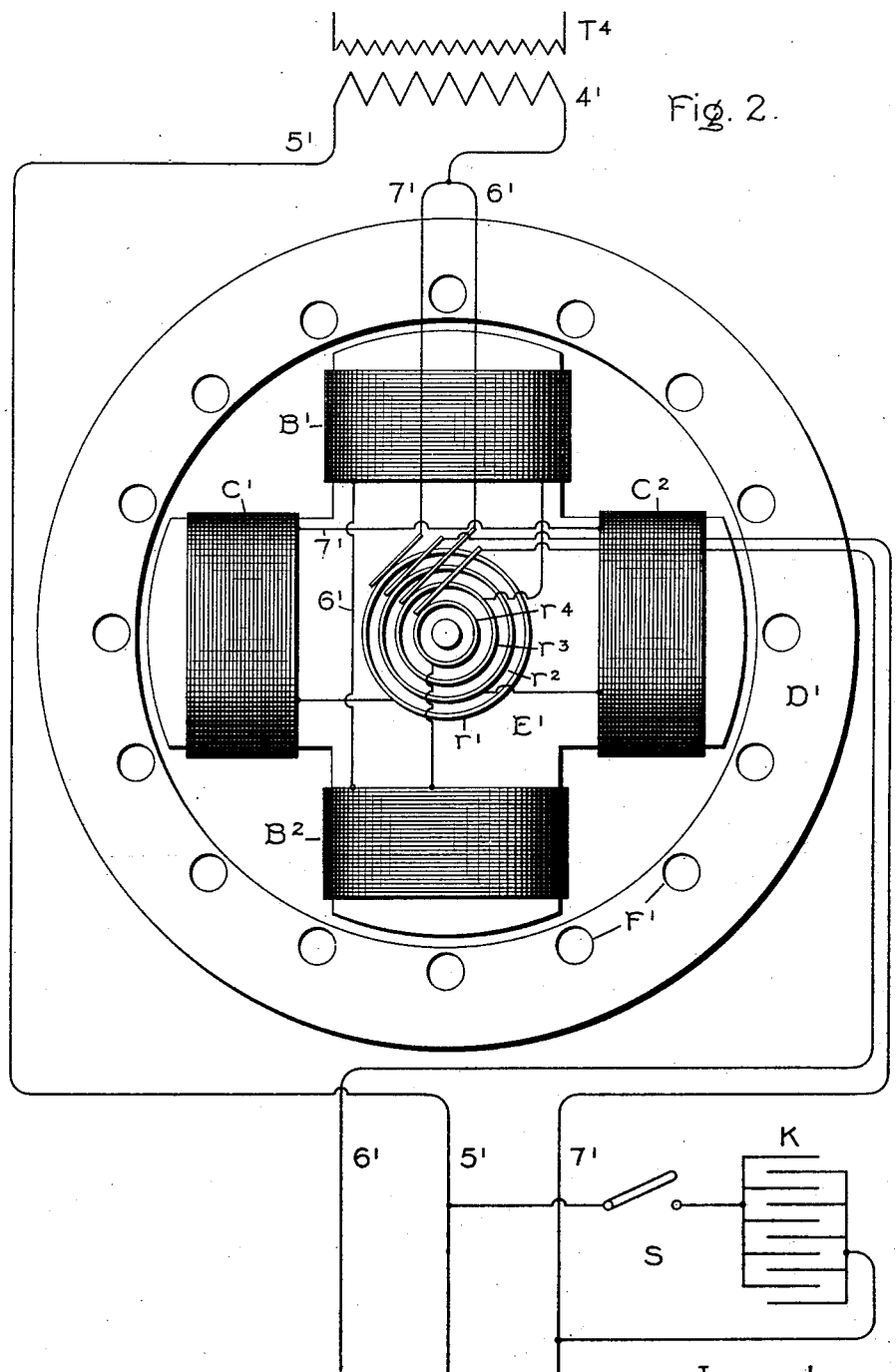

No. 714,638. Patented Nov. 25, 1902.
A. G. DAVIS.
METHOD OF INCREASING THE NUMBER OF PHASES OF CURRENTS IN ALTERNATING SYSTEMS.
(Application filed Apr. 18, 1902.)

(No Model.) 2 Sheets—Sheet 1.

Fig. 1.

Witnesses.
George H. Tilden
Helen C. Ford

Inventor.
Albert G. Davis

No. 714,638. Patented Nov. 25, 1902.
A. G. DAVIS.
METHOD OF INCREASING THE NUMBER OF PHASES OF CURRENTS IN ALTERNATING SYSTEMS.
(Application filed Apr. 18, 1902.)
(No Model.) 2 Sheets—Sheet 2.

Witnesses. Inventor.

UNITED STATES PATENT OFFICE.

ALBERT G. DAVIS, OF SCHENECTADY, NEW YORK, ASSIGNOR TO GENERAL ELECTRIC COMPANY, A CORPORATION OF NEW YORK.

METHOD OF INCREASING THE NUMBER OF PHASES OF CURRENTS IN ALTERNATING SYSTEMS.

SPECIFICATION forming part of Letters Patent No. 714,638, dated November 25, 1902.

Original application filed June 25, 1897, Serial No. 642,240. Divided and this application filed April 18, 1902. Serial No. 103,548. (No model.)

*To all whom it may concern:*

Be it known that I, ALBERT G. DAVIS, a citizen of the United States, residing at Schenectady, county of Schenectady, State of New York, have invented certain new and useful Improvements in Methods of Increasing the Number of Phases of Current in Alternating Systems, (Case No. 2,843,) of which the following is a specification.

This application is a division of my prior application, Serial No. 642,240, filed June 25, 1897.

My invention relates to systems of distribution of the alternating-current type; and it is particularly useful in connection with single-phase systems, though it is applicable to any alternating system whatever.

Briefly stated, my invention may be said to consist of a method of increasing the number of phases of an alternating-current system which consists in passing the current from any two mains of the system through a divided circuit, comprising a plurality of branch circuits in multiple with each other and acting upon one or more of the branches of said circuit by an electrodynamic phase-modifier to produce a phase displacement.

In the drawings attached to this specification, Figure 1 is a general view of a system of distribution containing an electrodynamic phase-modifier constructed and arranged to carry out the method constituting my present invention, and Fig. 2 is a view showing a modified construction of the phase-modifier.

Referring more particularly to Fig. 1, A represents a single-phase alternating generator feeding, through the step-up transformer T, if preferred, the single-phase distribution system 1 2. Connected to the mains of this system are shown various transformers T' T². At points where single-phase translating devices only are required—as, for instance, at the transformer T'—the arrangements are those usual in single-phase systems. I have shown lamps L' in multiple with the secondary mains of the transformer T'. I have also shown lamps L² in multiple with the secondary mains 4 5 of the transfomer T², and at points where multiphase translating devices are required I provide branch circuits 6 7, preferably from the secondary mains. These branch circuits 6 7 are shown as passing through windings C B on the primary member E of an electrodynamic phase-modifier, each branch circuit including one of the windings of the phase-modifier. From these windings the circuits lead through various translating devices to the wire 5 and back to the source of electromotive force. The conductors 5, 6, and 7 beyond the phase-modifier constitute what may be termed a "distribution system," since it is to these conductors that the translating devices are connected.

The electrodynamic phase-modifier consists of two relatively rotatable members D E. The member E is shown as consisting of a soft iron wound with the angularly-displaced windings B C. The member D, in this case the rotor, is wound with the direct-current winding F, excited in any preferred way, as by the direct-current exciter $E^2$, controlled by the rheostat R, which supplies current through the wires 8 9 and the rings $r'$ $r^2$ to the winding F.

The action of the device shown is as follows: The resultant polar line of the windings B and C is in advance of one of the said windings and behind the other. It therefore follows that when the direct-current member D is properly excited and driven at synchronous speed, either by external power or by the action of the resultant magnetic field of B C, the electromotive forces induced in these two coils by the action of the direct-current member D will be displaced in phase. It therefore follows that each of the electromotive forces between 6 and 5 and 7 and 5 at points beyond the phase-modifier is the resultant of the original electromotive force and the electromotive force of one of the coils B C; but these last-named electromotive forces are displaced in phase, one being behind the original electromotive force and the other in advance of it. It is possible to so proportion and adjust the windings B C and the direct-current member D as to give the resultant electromotive forces any desired displacement. In the form shown the phase displacement is ninety degrees, and the wires 5 6 7 form an interconnected two-phase system. I have shown connected to this system various translating devices, as the lamps $L^3$ $L^4$ and the motors $M'$ $M^2$ $M^3$. The motor $M'$ is an ordinary two-phase induction-motor and need not be particularly described. $M^2$ is a three-phase induction-motor fed through the Scott transformer $T^3$. $M^3$ is a two-phase synchronous motor with a separate exciter and rheostat.

While I have illustrated single-phase translating devices in connection with the mains 5 6 7, I prefer in general to connect the single-phase translating devices either to separate transformers, as $T'$, or to the mains 4 5, as shown at $L'$ $L^2$, as in this relation they do not tend to unbalance the system.

Fig. 2 illustrates another form which the electrodynamic phase-modifier may take. In this figure the wires $4'$ $5'$ lead, as before, from the source of single-phase current $T^4$. From $4'$ two wires $6'$ $7'$ lead through the electrodynamic phase-modifier to the distribution system. In this form the phase-modifier consists of two relatively rotatable members $E'$ $D'$. The member $D'$ consists of a ring wound with the short-circuited winding $F'$. The member $E'$ consists of a structure wound with four coils $B'$ $B^2$ $C'$ $C^2$. The wire $7'$ leads from $4'$ through the ring $r'$ to the coil $C'$, coil $C^2$, ring $r^2$, and thence to the distribution system. The wire $6'$ leads from $4'$ through ring $r^3$, coil $B'$, coil $B^2$, ring $r^4$, and out to the system.

It is obvious that this apparatus will operate, when once started, as a single-phase induction generator or motor, according to whether or not it is supplied with external power. The electromotive forces or counter electromotive forces of the windings $B'$ $B^2$ and $C'$ $C^2$ will be dephased, as in the form shown in Fig. 1, and a two-phase current will result.

In order to start the machine, I have shown a condenser K, in series with the switch S, in multiple with one of the windings of the phase-modifier. The action of this condenser is to cause a rotary field in the member $E'$ sufficient to start the modifier. When proper speed is attained, the switch S is opened and the device runs as described.

It will be seen that I have thus provided a simple and efficient method of increasing the number of phases of electromotive force across any two mains of a distribution system. I also provide a method by which multiphase current may be derived from any ordinary single-phase distribution system.

While I have disclosed herein certain specific forms of apparatus by means of which the method constituting the invention of the present application may be carried out, it will of course be understood that my present invention is not confined to any particular form of apparatus.

What I claim as my invention, and desire to secure by Letters Patent of the United States, is—

1. The method of increasing the number of phases of current in an alternating system, which consists in passing current from two leads of said system through a divided circuit, and electrodynamically displacing the phases of the currents in each branch of said circuit.

2. The method of producing multiphase current from single-phase current, which consists in passing said single-phase current through a divided circuit, and impressing an electrodynamic counter electromotive force upon each branch of said circuit in such a manner as to vary the phase relations of the currents therein.

3. The method of producing two-phase current from single-phase current, which consists in passing said single-phase current through a divided circuit, and acting upon the branches of said circuit by electrodynamically-generated electromotive forces, in such a way as to retard the current in one of said branches and to advance the current in the other of said branches.

In witness whereof I have hereunto set my hand this 16th day of April, 1902.

ALBERT G. DAVIS.

Witnesses:
BENJAMIN B. HULL,
HELEN ORFORD.